Sept. 1, 1936.  L. E. LA BOMBARD ET AL  2,053,153
METHOD AND MACHINE FOR FORMING CORRUGATIONS
IN TUBULAR BARREL BODIES OF CONTAINERS
Filed Jan. 16, 1934  4 Sheets-Sheet 1
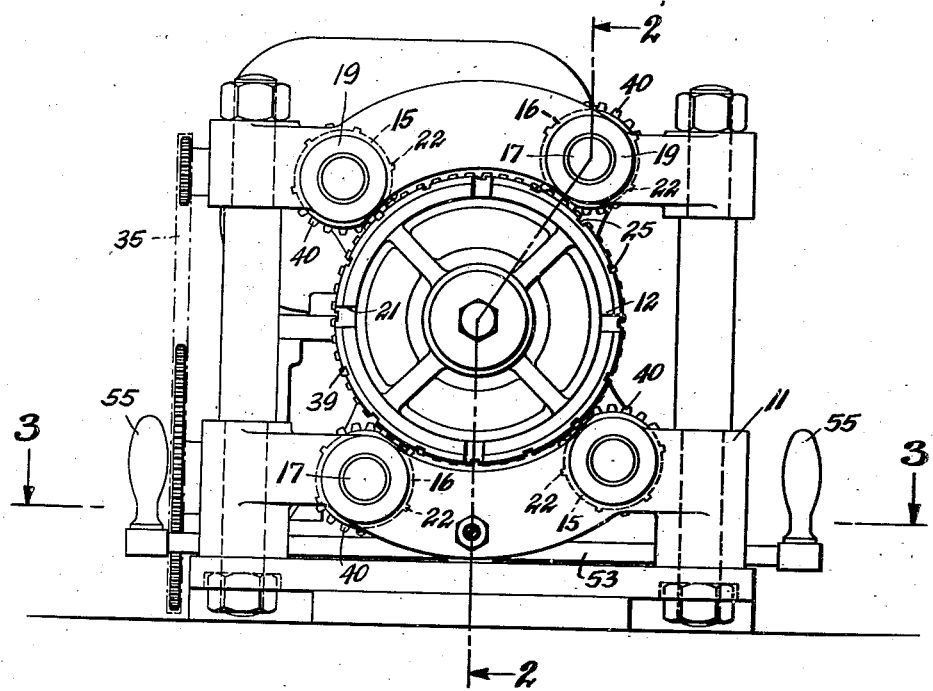
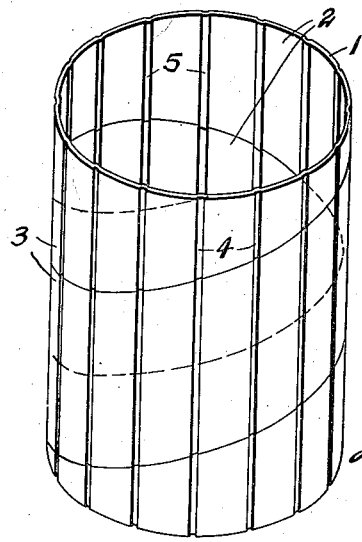
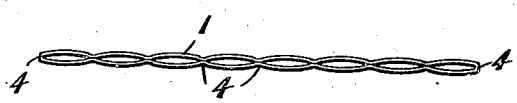
INVENTORS
BY
ATTORNEYS.

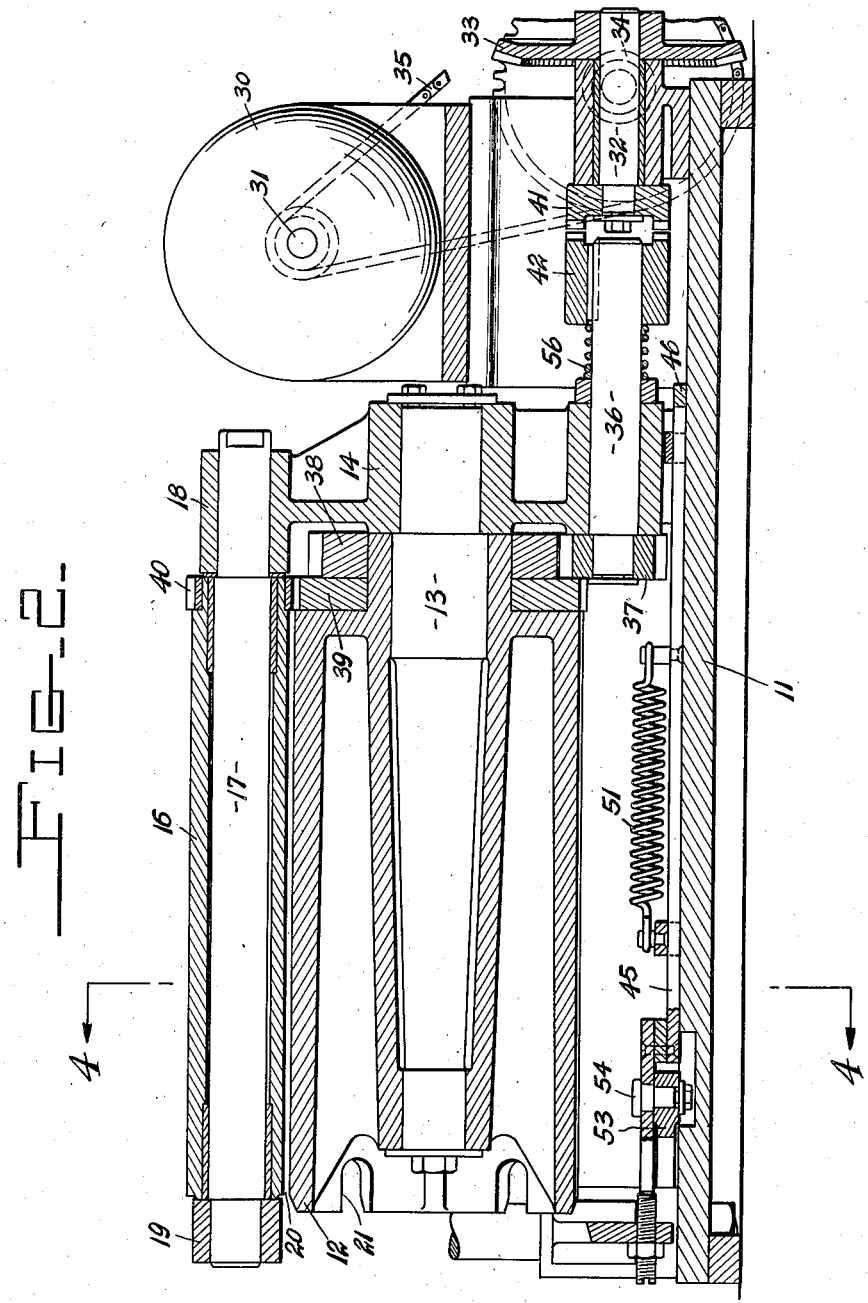

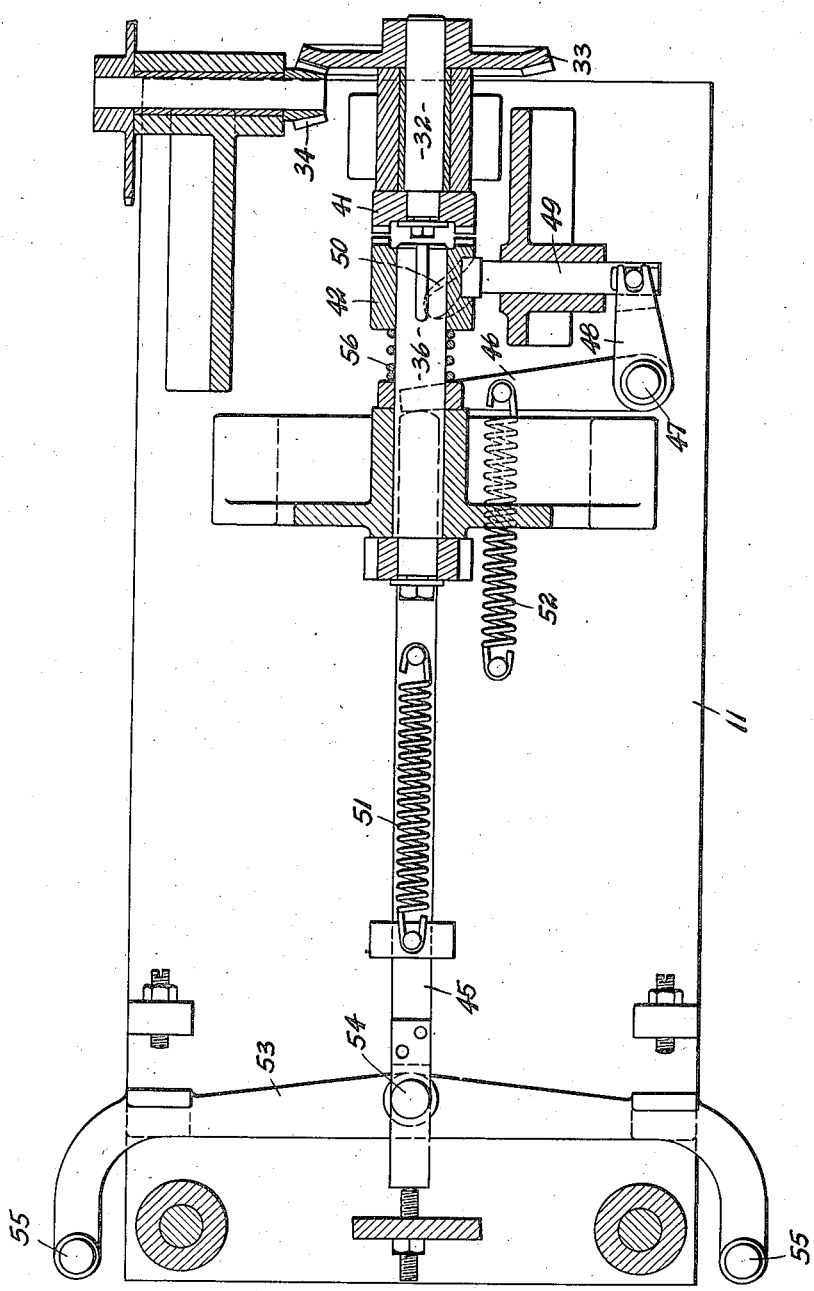

Sept. 1, 1936. L. E. LA BOMBARD ET AL 2,053,153
METHOD AND MACHINE FOR FORMING CORRUGATIONS
IN TUBULAR BARREL BODIES OF CONTAINERS
Filed Jan. 16, 1934 4 Sheets-Sheet 4
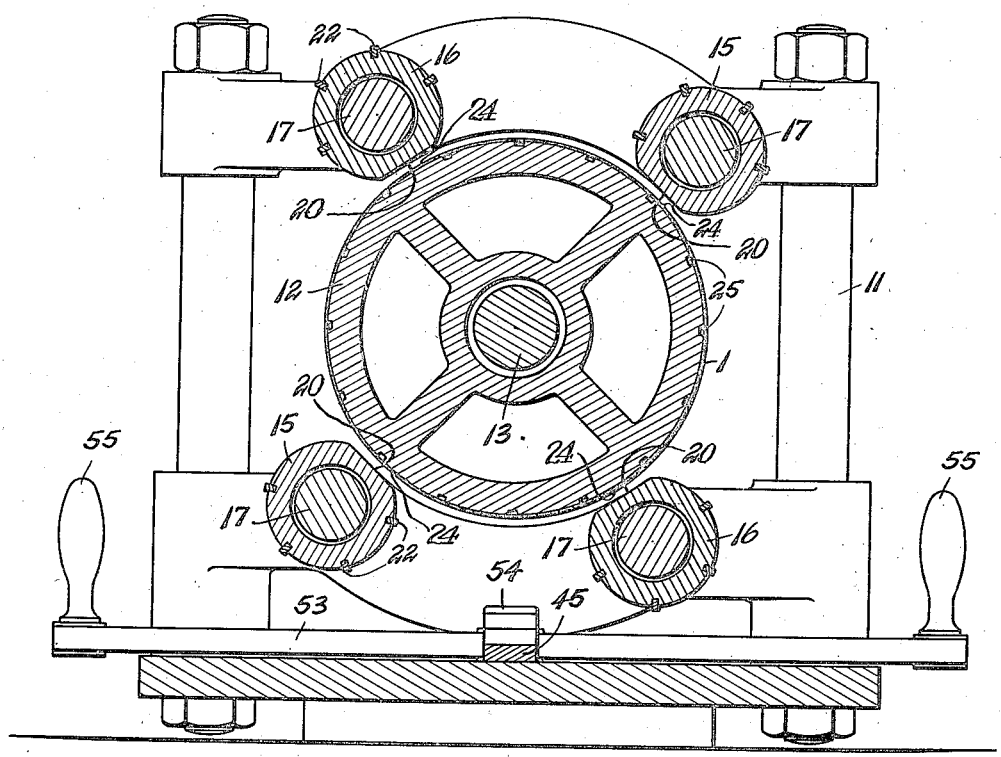
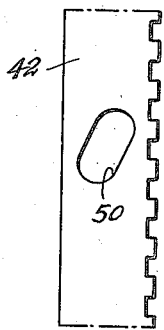
INVENTORS
*Leon E. La Bombard and Guenther Brinkmann*
BY
*Bedell & Thompson*
ATTORNEYS.

Patented Sept. 1, 1936

2,053,153

UNITED STATES PATENT OFFICE

2,053,153

METHOD AND MACHINE FOR FORMING CORRUGATIONS IN TUBULAR BARREL BODIES OF CONTAINERS

Leon E. La Bombard and Guenther Brinkmann, Fulton, N. Y., assignors to Oswego Falls Corporation, Fulton, N. Y., a corporation of New York Application January 16, 1934, Serial No. 706,898

10 Claims. (Cl. 93—80)

This invention has for its object a method of forming tubular barrel bodies which are formed of fibrous material, as cardboard, with corrugations to stiffen them when assembled with the top and bottom to form a container against compression and tension, both in lengthwise and radial directions, and so locate the corrugations in pairs so that the corrugations of each pair are located diametrically opposite each other, and the tubular barrel can be folded flat for economy in space in storing and shipping, and re-expanded into tubular form for assembly with a top and bottom, and also a machine for carrying out the method of corrugating.

It further has for its object a machine embodying a mandrel so supported that the tubular body or barrel can be sleeved thereon from one end and corrugating rollers so arranged relatively to the mandrel that the mandrel is relieved of supporting strains during the corrugating operation.

It further has for its object an arrangement of the corrugated rollers and the mandrel permitting the barrel to be sleeved on the mandrel between the rollers, and an actuating and control mechanism including means by which the machine is stopped, or the rollers stopped in such position that the corrugating ribs of the rollers are in such position as to permit removal of the corrugated barrel leaving the space open for placing, or sleeving, on the mandrel a new barrel to be corrugated.

Other objects will appear throughout the specification.

The invention consists in the method hereinafter set forth and claimed, and in the novel features and the combinations and constructions hereinafter set forth and claimed.

In describing this invention, reference is had to the accompanying drawings in which like characters designate corresponding parts in all the views.

Figure 1 is an end elevation of a machine embodying my invention and for carrying out the method.

Figure 2 is a sectional view on line 2—2 Figure 1.

Figure 3 is a plan view, looking downwardly, taken on the plane of line 3—3, Figure 1, parts being omitted, illustrating a portion of the actuating and control mechanism.

Figure 4 is a sectional view on line 4—4, Figure 2.

Figure 5 is a layout of the cam which effects the automatic throwing out of the periodic clutch.

Figure 6 is a perspective view of the finished corrugated barrel.

Figure 7 is an edge view showing the barrel collapsed, or folded, into flat form.

Containers formed of fibrous material, as cardboard, are used extensively for materials which are filled, or poured, into them, and one of the extensive uses is for ice cream and the like in which the ice cream is delivered to the customer, it being kept by the dealer in a refrigerator until sold. The ice cream manufacturer buys the containers and uses them when necessary, and in order to economize in space in shipping and storage, the containers are shipped and stored in knock-down condition, that is, the barrels are folded flat and the heads nested together so that the user when needing a container re-expands the barrel into cylindrical form and applies the bottom, fills the container, and applies the top. The containers must be cheap so as not to add materially to the cost of the contents to the consumer, and also of ample strength to withstand rough handling which it is subjected to when filled.

This invention has to do with the forming of the barrel, or body, of the container from a comparatively light, somewhat flexible material, as cardboard, and so forming it that it is stiffened when assembled with the top and bottom against compression and tension, both endwise and radial, and also formed so that it can be folded flat along any two of a large number of folding lines, and again re-expanded into its original form.

The method consists in forming a tubular barrel with lengthwise parallel corrugations from end to end thereof, which serve as folding lines and stiffeners, the corrugations being arranged in pairs with those of each pair arranged diametrically opposite each other, so that the cylindrical barrel can be folded, or collapsed, into flat form along any two diametrically opposite corrugations, as folding lines. The corrugations are preferably spaced equi-distantly apart throughout the circumference of the barrel. Preferably, the barrel is formed seamless in contra-distinction to being split with the split ends secured together, and is formed up of plies, or strips, spirally wound into tubular form with the corrugations impressed into the barrel from the outer side thereof. The corrugations are shallow with wide flat crowns, so that the inner surface of the barrel is comparatively smooth as the forming of the corrugations results in merely low, broad ribs on the interior of the barrel, and does not result in corners, cracks, and crevices, on the interior of the barrel.

1 designates the tubular body, or barrel, here shown as consisting of inner and outer spirally wound plies or layers 2, 3.

4 designates shallow, lengthwise, corrugations with flat crowns extending lengthwise of the body 1 from end to end thereof parallel to each other, and preferably parallel to the axis of the barrel. These corrugations are preferably impressed into the body from the outer side thereof forming shallow, wide grooves on the periphery of the barrel, and flat ribs 5 on the inner side. Each corrugation 4 is located exactly diametrically opposite to, or is paired with, another corrugation 4 on the diametrically opposite side of the body so that any two diametrically opposite corrugations can be used as folding lines in collapsing the barrel into flat form, and no care may be taken in selecting or providing for any particular folding lines.

The machine for carrying out the process comprises a suitable supporting frame, a mandrel mounted in the frame for entering and supporting the barrel, elements, as rollers, opposed to and spaced from the periphery of the mandrel with the space between the rollers and mandrel receiving the barrel, the mandrel and the rollers having coacting means which, upon actuation of the mandrel and the rollers, forms corrugations in the barrel, actuating means for effecting relative movement of the mandrel and the rollers, and for rotating the rollers to effect the corrugating operation. The rollers are so arranged as to relieve the mandrel of strains during the corrugating operation, and the corrugating means of the rollers and the mandrel are also so arranged that they are not all corrugating at the same instant, but work in an alternating relation so that the load on the actuating means, or motor, is substantially, evenly distributed.

As here shown, the relative movement of the mandrel and the rollers is effected by rotating the mandrel about its axis.

11 designates the frame which may be of any suitable form, size and construction.

12 designates the mandrel which is mounted upon a shaft or spindle 13 journalled at one end in a bearing 14 formed in the frame so that the mandrel is supported at one end, and its other end is substantially free, or in other words, the mandrel overhangs.

15 and 16 designate the rollers, these being shown as mounted on shafts 17, each of which is journalled at its opposite ends in bearings 18, 19, in the frame, the rollers extending lengthwise of the mandrel parallel to the axis thereof.

As here illustrated, the rollers 15 constitute a pair which are arranged diametrically opposite each other, and the rollers 16 another pair arranged diametrically opposite each other, the pairs of rollers being arranged in planes radial to the mandrel at an angle of more or less than 90°. The rollers are arranged with their peripheries spaced from the periphery of the mandrel forming a space occupied by the barrel when on the mandrel. The space between the rollers and the mandrel is preferably slightly less than the thickness of the barrel.

Each of the rollers 15, 16 is provided with a plurality of lengthwise ribs 22 with a blank, peripheral, cylindrical face between the ribs, with two of the ribs being spaced apart a greater distance than the other ribs are spaced from each other and from the two ribs, so that a comparatively large, blank, ribless portion is provided which is opposed to the mandrel when the machine is in stopped position. This blank space on the rollers 15, 16 is recessed or relieved as at 24 to permit the sleeving on of the barrel and the removal of the barrel, after it has been corrugated. If desired, the rollers 15, 16 may be mounted upon eccentric bearings or other means may be employed, whereby the rollers 15, 16 can be moved regularly toward and from the mandrel to permit the sleeving on and off of the barrel. Due to the fact that the mandrel is supported from the rear end, the barrel can be sleeved on and off the mandrel by axial movement. The mandrel is provided at its free end with suitable finger openings, or cut-outs 21 for permitting the operator to take hold of the barrel for putting it on and taking it off the mandrel.

The mandrel is provided with lengthwise peripheral grooves 25 so spaced as to mate with the ribs 22. The rollers are so arranged, or timed, in their operation, that the relieved portions 24 thereof are opposed to the mandrel at the end of the corrugating operation. The pairs of rollers 15 are so timed in their operation that the ribs 22 thereof coact with diametrically opposite grooves 25 of the mandrel at the same instant and the ribs of the rollers 16 coact with diametrically opposite grooves 25 of the mandrel at the same instant. However, owing to the relative location of the pairs of rollers, the ribs 22 on the pair of rollers 15 act on the barrel at a different time than the ribs of the pair of rollers 16. With this arrangement, the overhanging mandrel is relieved of supporting strains during the corrugating operation. However, only two corrugations are formed in the barrel at a time.

By this arrangement, the load on the motor is substantially evenly distributed.

The actuating means comprises a suitable electric motor 30, and motion transmitting means between the motor shaft 31 and the shaft 13 of the mandrel and the shafts 17 of the rollers. The motion transmitting means includes a drive shaft 32 connected to the motor through suitable gearing, as 33, 34, and belt 35, a driven shaft 36 suitably mounted in the frame, and having a pinion 37 thereon meshing with a gear 38 on the spindle 13, and a gear 39 rotatable with the mandrel and meshing with pinions 40 on the rollers. The gear ratio between the mandrel and the pinions through the gear 39 and pinions 40 is substantially four to one.

The motion transmitting means further includes driving and driven clutch sections 41 and 42 mounted respectively on the driving and driven shafts sections 32 and 36, the clutch section 42 being operated by control mechanism, which is manually operable to throw in the clutch and automatically operable to throw out the clutch.

The control mechanism may be of any suitable form, size and construction, that here shown includes a manually operable shift rod 45 suitably guided in the frame and connections operated thereby to control the shifting of the clutch section 42 into its engaged position, the connections here shown being a lever 46 suitably mounted at 47 on the frame at one end and thrusting at its other end against the rod 45, a lever arm 48 arranged at an angle to the arm 46 so that the arms 46 and 48 act substantially as a bell crank, and a slidable rod or latch 49 suitably mounted in the frame and coacting with the cam groove 50 in the clutch section 42 to hold the clutch section 42 in its out position against shifting to in position by a spring acting on the section 42.

The rod 45 and the lever 46 are acted upon by suitable returning springs 51, 52. The rod 45 is initially actuated preferably by a two hand control mechanism requiring both hands of the operator. That here shown is an equalizing lever 53 pivoted at 54 between its ends to the shift rod 45 and having suitable handles 55 at its opposite ends. The handles are located within convenient reach of the operator when he stands at the front of the machine, or in position to sleeve the barrel on the mandrel and remove the finished barrel therefrom. Moving of either handle obviously will result in a pivotal movement, and movement of both handles simultaneously will result in moving the shift rod 45 axially to actuate the levers 46, 47, to withdraw the rod or latch 49 from out of engagement with the cam groove of the clutch section 42. The clutch section 42 is urged into its engaged position by a spring 56, and is slidable axially on the driven shaft 36. The clutch section 42 is, in fact, a periodic, or a one-revolution clutch, and it is thrown out automatically by the cam groove 50. When the shift rod 45 is operated by means of the handles, the follower or rod 49 is withdrawn from the cam permitting the spring 56 to throw the clutch section 42 into engaged position. The handles are then released and under the reaction of the spring 52, the latch 49 is thrust against the clutch section 42, but is out of alinement with the cam groove. When the clutch section has nearly completed a revolution, the cam slot is brought into alinement with the latch 49, and under urge of the spring 52, the latch enters the cam groove. Upon continued rotation of the clutch section 42, the cam groove acts on the latch causing the clutch section to be withdrawn from engaged position. The latch, or follower, upon reaching the end wall of the cam groove stops the rotation of the driven shaft and hence, the rotation of the mandrel and the rollers. The end wall of the cam groove is so located as to come into engagement with the follower or plunger 49 when the blank portions 24 of the rollers are opposed to the mandrel, or the barrel thereon, so that the ribs of none of the rollers are coacting with the groove of the mandrel, and hence the corrugated barrel can be removed, and a new one sleeved on the mandrel.

What we claim is:

1. In a machine for forming corrugations in tubular barrel bodies of fibrous flexible material, the combination of a mandrel for entering and supporting the barrel, diametrically located rollers opposed to and spaced from the periphery of the mandrel with the space between them receiving the barrel, the mandrel and the rollers being formed with coacting peripheral grooves and ribs, the grooves being formed in one and the ribs in the other, and means for effecting relative movement of the mandrel with the barrel thereon, and the rollers, and for rotating the rollers during such relative movement to bring the grooves and ribs into and out of mesh with the ribs movable into and out of the space between the mandrel and the rollers.

2. In a machine for forming corrugations in tubular barrel bodies of fibrous material, the combination of a mandrel for entering and supporting the barrel, said mandrel being supported at one end and having its other end free for permitting the barrel to be sleeved thereon and removed, rollers opposed to and spaced from the periphery of the mandrel, with the space between them receiving the barrel, the mandrel and the rollers being formed with complemental grooves and ribs extending lengthwise thereof and arranged to come into mesh whereby the ribs move into and out of the space between the peripheries of the mandrel and the rollers to form the corrugations, said rollers being arranged to relieve the mandrel of supporting strains, and means for effecting relative movement of the mandrel with the barrel thereon, and the rollers, and for rotating the rollers during said relative movement.

3. In a machine for forming corrugations in tubular barrel bodies of fibrous flexible material, the combination of a rotatable mandrel for entering and supporting the barrel, rollers mounted on diametrically opposite sides of the barrel and opposed to and spaced from the periphery of the mandrel with the space between them receiving the barrel, the mandrel and the roller being formed with complemental lengthwise peripheral grooves and ribs, the mandrel being supported at one end and having its other end free for permitting the barrel to be sleeved thereon between its periphery and the peripheries of the rollers and the coacting rib and groove of the mandrel and one roller being arranged to come into coaction at the same time as the coacting rib and groove of the mandrel and other roller, and means for rotating the mandrel and the rollers.

4. In a machine for forming with corrugations tubular barrel bodies of fibrous flexible material, the combination of a mandrel for entering and supporting the barrel, a plurality of pairs of rollers opposed to and spaced from the periphery of the mandrel with the space between them receiving the barrel, the rollers of each pair being located diametrically opposite each other, the rollers and the mandrel being formed with coacting lengthwise ribs and grooves for forming the corrugations in the barrel, the coacting ribs and grooves of the mandrel and one pair of rollers being arranged to come into coaction while the coacting grooves and ribs of the other pair are out of coaction, and means for rotating the mandrel with the barrel thereon, and for rotating the rollers.

5. In a machine for forming with corrugations tubular barrel bodies of fibrous flexible material, the combination of a mandrel for entering and supporting the barrel, a plurality of pairs of rollers opposed to and spaced from the periphery of the mandrel with the space between them receiving the barrel, the rollers of each pair being located diametrically opposite each other, the rollers and the mandrel being formed with coacting lengthwise ribs and grooves for forming the corrugations in the barrel, the coacting ribs and grooves of the mandrel and one pair of rollers being arranged to come into coaction while the coacting grooves and ribs of the other pair are out of coaction, the mandrel being supported at one end and having its other end free for permitting the barrel to be mounted thereon and the rollers serving to support the mandrel and hold it from misalinement, and means for rotating the mandrel and the rollers.

6. In a machine for forming corrugations in tubular barrel bodies of fibrous flexible material, the combination of a mandrel for entering and supporting the barrel, the mandrel being supported at one end and free at its other end, a series of rollers mounted with their peripheries opposed to and spaced from the mandrel providing a space for the barrel to be sleeved on the mandrel, the mandrel being formed with lengthwise grooves and the rollers with lengthwise ribs for entering the grooves, the rollers being spaced apart and located to relieve the mandrel of supporting strains and the ribs on the different rollers being arranged so that the ribs of some of the rollers are out of coacting relation to the grooves of the mandrel while the ribs of other rollers are coacting with the grooves of the mandrel, means for rotating the mandrel and the rollers, and control means for the actuating means including stop mechanism for stopping the rotation of the rollers when the ribs of all of them are out of juxtaposition to the grooves of the mandrel, whereby the corrugated barrel can be removed from the mandrel and a new barrel sleeved thereon.

7. In a machine for forming corrugations in tubular barrel bodies, the combination of a mandrel for entering and supporting the barrel, a pair of diametrically opposed corrugating rollers coacting with the mandrel, the mandrel and the rollers having coacting peripheral ribs and grooves, means for effecting rotation of the mandrel and the rollers, and means for effecting a clearance between the rollers and the mandrel to permit the barrel to be sleeved on and off the mandrel.

8. In a machine for forming corrugations in tubular barrel bodies, the combination of a mandrel for entering and supporting the barrel, a plurality of pairs of diametrically opposed corrugating rollers, arranged in spaced apart relationship relative to the periphery of the mandrel with the space between the rollers and the mandrel for receiving the barrel, the rollers and the mandrel being formed with complemental grooves and ribs extending lengthwise thereof and arranged to come into mesh upon rotation of the mandrel and rollers, and means for effecting successive coaction of the pairs of rollers with the mandrel during a single revolution of the latter, and means for rotating the mandrel.

9. In a machine for forming corrugations in tubular barrel bodies, the combination of a suitable frame, a mandrel rotatably journalled in the frame, said mandrel being supported at one end and free at its other end, a pair of diametrically opposed rollers rotatably journalled in the frame with their axes extending parallel with the axis of the mandrel, and being held in spaced apart relationship relative to the periphery of the mandrel to permit the barrel to be sleeved on the mandrel, the rollers and the mandrel being formed with complemental grooves and ribs extending lengthwise thereof and arranged to come into mesh upon rotation of the mandrel and the rollers, and means for rotating the mandrel.

10. The method of making fibrous tubular barrel bodies for containers which are foldable into flat form for storing and shipping, and expansible into original tubular form for use with end closures as a container, said method consisting in forming a seamless tubular barrel of fibrous stock, sleeving said barrel axially on a mandrel, rotating the mandrel and during such rotation impressing a series of corrugations extending lengthwise of the barrel, and subsequently removing the corrugated barrel from the mandrel.

LEON E. LA BOMBARD.
GUENTHER BRINKMANN.